(12) United States Patent
Lin et al.

(10) Patent No.: US 7,489,370 B2
(45) Date of Patent: Feb. 10, 2009

(54) LIQUID CRYSTAL DISPLAY DEVICE AND METHOD FOR MAKING THE SAME AND METHOD FOR REPAIRING DEFECTIVE PIXEL USING THE SAME

(75) Inventors: Sung Chun Lin, Fongyuan (TW); Ming Tien Lin, Lujhou (TW); Te Cheng Chung, Jhongli (TW)

(73) Assignee: Hannstar Display Corp., Taipei (TW)

( * ) Notice: Subject to any disclaimer, the term of this patent is extended or adjusted under 35 U.S.C. 154(b) by 664 days.

(21) Appl. No.: 11/253,681

(22) Filed: Oct. 20, 2005

(65) Prior Publication Data

US 2007/0091241 A1   Apr. 26, 2007

(51) Int. Cl.
   *G02F 1/136*       (2006.01)
(52) U.S. Cl. .......................................... 349/48; 349/43
(58) Field of Classification Search .................. 349/43, 349/48

See application file for complete search history.

(56) References Cited

U.S. PATENT DOCUMENTS 6,833,882 B2   12/2004 Lee
7,230,658 B2 *  6/2007 Chae ........................... 349/48

* cited by examiner

*Primary Examiner*—David Nelms
*Assistant Examiner*—Phu Vu (57) ABSTRACT

A liquid crystal display device comprises a first sub-pixel electrode and a second sub-pixel electrode together forming a pixel cell, a dual thin film transistor having two electrodes electrically connected to the first and second sub-pixel electrodes respectively, and a connecting layer formed between the first and second sub-pixel electrodes. When one of the first and second sub-pixel electrodes is defective, the electrical path between the defective one and the dual thin film transistor is cut; then, the first and second sub-pixel electrodes are electrically connected together through the connecting layer whereby repairing the defective pixel cell.

18 Claims, 7 Drawing Sheets

LIQUID CRYSTAL DISPLAY DEVICE AND METHOD FOR MAKING THE SAME AND METHOD FOR REPAIRING DEFECTIVE PIXEL USING THE SAME

BACKGROUND OF THE INVENTION

1. Field of the Invention

This invention generally relates to a liquid crystal display device, and more particularly to a liquid crystal display device having a pixel repairing structure.

2. Description of the Related Art

A liquid crystal display device typically includes a liquid crystal panel, which is formed by a pair of substrates, and a plurality of liquid crystal cells formed on the liquid crystal panel. The substrates are maintained apart from and parallel to each other, and a liquid crystal material is sandwiched between the substrates. The liquid crystal material changes its optical characteristics in response to applied voltage signals.

Millions of pixel electrodes are formed on one of the substrates and arranged in a matrix type for applying voltage signals to the liquid crystal cells, and a common electrode is formed on the other one. Each of the pixel electrodes is connected to a thin film transistor (TFT), and applies a voltage signal to the liquid crystal cell according to a data signal received by the connected thin film transistor. However, when one of the pixel electrodes or the transistors connected to the pixel electrodes has a defect, a defective pixel may occur and thus cause a bright dot or dark dot on the liquid crystal display device. Therefore, a repair for defective pixel is necessary so that the observer will not perceive the defective pixel.

U.S. Pat. No. 6,833,882 B2 issued to Lee on Dec. 21, 2004 (hereinafter, Lee), which is incorporated herein by reference, has discussed some conventional methods illustrated in its FIGS. 1 and 2 for repairing the defective pixel and the drawbacks of those conventional methods. In order to overcome the drawbacks of those conventional methods, Lee has disclosed a liquid crystal display device and a pixel repairing method for increasing aperture ratio and repair efficiency. In Lee's method, when a defective pixel occurs, a data signal from a data line to an associated TFT will be cut by using a laser; thereafter, the defective pixel is connected with a repair drain electrode of a previous TFT so that the defective pixel is repaired. However, the repaired defective pixel of Lee can not realize a normal color as a normal pixel used to do, but only can realize the same color as a previous pixel. Thus, if a liquid crystal panel is larger than 17 inches, the repaired defective pixel may be easily perceivable by inputting the data of the previous pixel.

SUMMARY OF THE INVENTION

It is an object of the present invention to provide a liquid crystal display device and a method for making the same, wherein the liquid crystal display device can solve the drawbacks of the conventional methods for repairing the defective pixel.

It is another object of the present invention to provide a method for repairing a liquid crystal display device having a defective pixel.

In order to achieve the above object, the present invention provides a liquid crystal display device comprising a first sub-pixel electrode and a second sub-pixel electrode together forming a pixel cell, a dual thin film transistor having two electrodes electrically connected to the first and second sub-pixel electrodes respectively, and a connecting layer formed between the first and second sub-pixel electrodes.

According to the liquid crystal display device of the present invention, when one of the first and second sub-pixel electrodes is defective, the electrical path between the defective one and the dual thin film transistor is cut; then, the first and second sub-pixel electrodes are electrically connected together through the connecting layer whereby repairing the defective pixel cell.

The present invention further provides a method for repairing a pixel cell, which has a first sub-pixel electrode and a second sub-pixel electrode electrically connecting to a dual thin film transistor, the method comprising the steps of: sensing a defective one of the first and second sub-pixel electrodes; making the defective one of the first and second sub-pixel electrodes electrically isolated from the dual thin film transistor; and electrically connecting the first and second sub-pixel electrodes.

According to the method for repairing a pixel cell of the present invention, the defective first/second sub-pixel electrode is electrically connected to the normal second/first sub-pixel electrode such that the defective first/second sub-pixel electrode can be repaired and driven by the same dual thin film transistor so as to realize a normal color as it used to do.

BRIEF DESCRIPTION OF THE DRAWINGS

Other objects, advantages, and novel features of the present invention will become more apparent from the following detailed description when taken in conjunction with the accompanying drawings.

7A-7D are cross-sectional views for illustrating the method for making the pixel repairing structure shown in FIG. 3.

DETAILED DESCRIPTION OF THE PREFERRED EMBODIMENT

Figure 1:
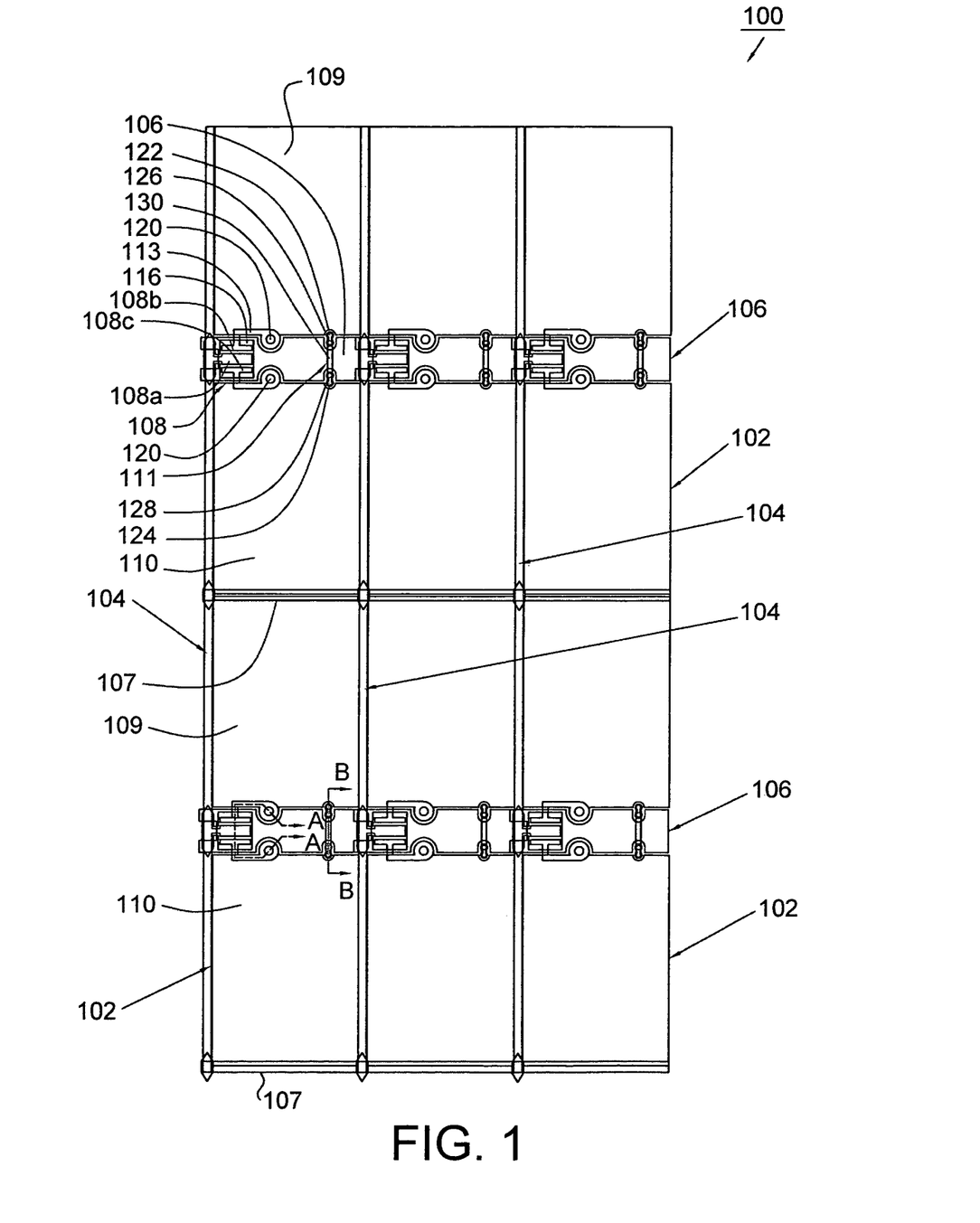
FIG. 1 shows a partial plan view of a liquid crystal display device according to one embodiment of the present invention.

FIG. 1 shows a partial plan view of a liquid crystal display device 100 according to one embodiment of the present invention. The liquid crystal display device 100 comprises a plurality of pixel regions 102, a plurality of data lines 104, a plurality of gate lines 106, a plurality of common lines 107, and a plurality of dual thin film transistors 108.

The plurality of pixel regions 102 are arranged in rows and columns to form a matrix, and each pixel region 102 has an upper pixel electrode 109 and a lower pixel electrode 110 formed thereon. The data line 104 is electrically coupled, through all the dual thin film transistors 108 at the same column, to all the upper and lower pixel electrodes 109, 110 of the pixel regions 102 arranged in the same column. The gate line 106 is electrically coupled, through all the dual thin film transistors 108 in the same row, to all the upper and lower pixel electrodes 109, 110 of the pixel regions 102 arranged in the same row. The common line 107 is formed between an upper pixel electrode 109 and a lower pixel electrode 110 of two adjacent pixel regions 102. The dual thin film transistor 108 is formed within the pixel region 102 and positioned at the intersection of the data line 104 and the gate line 106. The dual thin film transistor 108 has a common source electrode 108a electrically connected to the data line 104, a first drain electrode 108b electrically connected to the upper pixel electrode 109, a second drain electrode 108c electrically connected to the lower pixel electrode 110. In this embodiment, the common source electrode 108a, the first drain electrode 108b and the second drain electrode 108c are overlapped with the gate line 106 so that the gate line 106 can function as a gate electrode of the dual thin film transistor 108. In addition, it should be noted that the terms "source electrode" and "drain electrode" can be alternatively used in accordance with the direction of the current flow in the dual thin film transistor 108.

Figure 2:
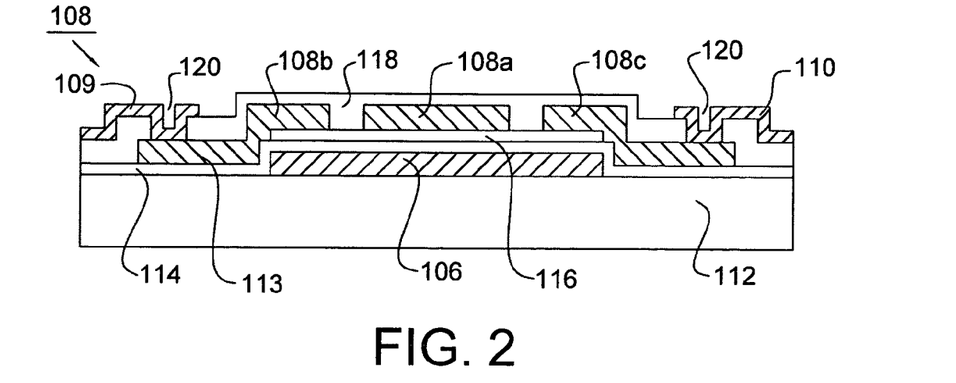
FIG. 2 shows a cross-sectional view taken along line A-A of FIG. 1 for illustrating the dual thin film transistor.

FIG. 2 shows a cross-sectional view taken along line A-A of FIG. 1 for illustrating the dual thin film transistor 108. The dual thin film transistor 108 has the gate electrode, i.e. gate line 106, formed on a substrate 112. A gate insulating layer 114 is formed to cover the gate line 106. A semiconductor layer 116 is formed on the gate insulating layer 114 and overlapped with the gate line 106. The common source electrode 108a is formed on the semiconductor layer 116, and the first drain electrode 108b and the second drain electrode 108c are formed, respectively opposite to the common source electrode 108a, on the gate insulating layer 114 with parts of them covering the semiconductor layer 116. A protective layer 118 is formed on the gate insulating layer 114 to cover the common source electrode 108a, the first drain electrode 108b, the second drain electrode 108c, and parts of the semiconductor layer 116. The upper and lower pixel electrodes 109 and 110 are formed on the protective layer 118 and electrically connected to the first and second drains 108b and 108c, respectively, through two contact holes 120 formed in the protective layer 118.

The dual thin film transistors 108 further has a first predetermined channel formed between the common source electrode 108a and the first drain electrode 108b on the semiconductor layer 116, and a second predetermined channel formed between the common source electrode 108a and the second drain electrode 108c on the semiconductor layer 116. In addition, the gate line 106 can receive a scan signal and then synchronously switch on/off the first and second predetermined channels, i.e. turning on/off the dual thin film transistor 108, according to the scan signal.

When the gate electrode, i.e. the gate line 106, is applied with the scan signal, the common source electrode 108a can receive a data signal from the data line 104 and then synchronously transfer the data signal to the first and second drain electrodes 108b and 108c, respectively, through the first and second predetermined channels. Then, the data signal can be synchronously applied to the upper and lower pixel electrodes 109 and 110 by the first and second drain electrodes 108b and 108c, respectively, such that the upper and lower pixel electrodes 109 and 110 can respectively generate the same potential difference for rotating the liquid crystal (not shown) within a pixel cell. The pixel cell described in this embodiment is the basic unit to form a color, e.g. one of the Red, Green and Blue. According to the liquid crystal display device 100 of the present invention, the pixel region 102 has two sub-pixel electrodes, i.e. the pixel electrode 109 and 110, to form a pixel cell, which is different from any conventional arrangement that a pixel region only has one pixel electrode to form a pixel cell.

Now referring to FIG. 1, the pixel region 102 further has a pixel repairing structure 111 formed between the upper pixel electrode 109 and the lower pixel electrode 110. The pixel repairing structure 111 is formed to repair a defective pixel and will be described in the following content.

Figure 3:
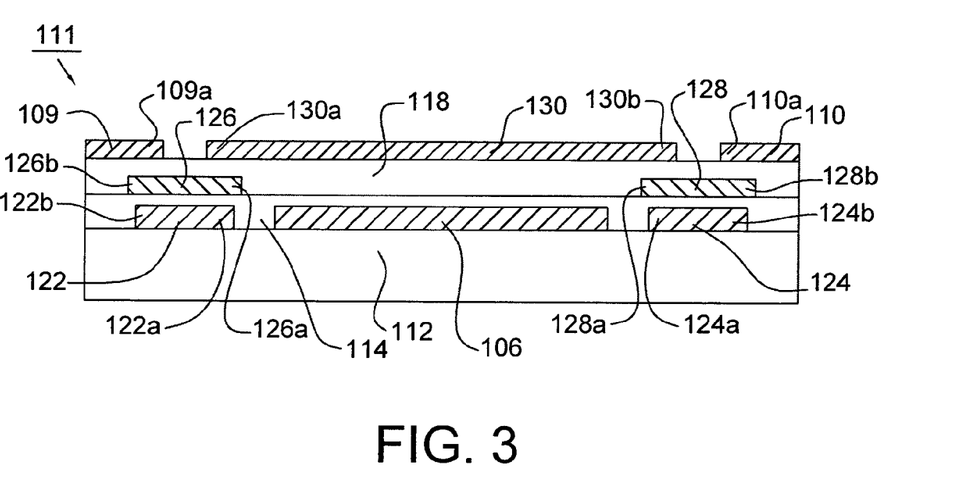
FIG. 3 shows a cross-sectional view taken along line B-B of FIG. 1 for illustrating the pixel repairing structure.

FIG. 3 shows a cross-sectional view taken along line B-B of FIG. 1 for illustrating the pixel repairing structure 111. The pixel repairing structure 111 is formed between the upper pixel electrode 109 and lower pixel electrode 110. The pixel repairing structure 111 has a first bottom linking layer 122, a second bottom linking layer 124, a first middle linking layer 126, a second middle linking layer 128, and a connecting layer 130. The first and second bottom linking layers 122 and 124 are formed on the substrate 112 and respectively adjacent to two sides of the gate line 106. The first and second middle linking layers 126 and 128 are formed on the gate insulating layer 114 and overlapped with the first and second bottom linking layers 122 and 124, respectively. The connecting layer 130 is formed on the protective layer 118 and across the gate line 106 between the upper pixel electrode 109 and the lower pixel electrode 110. The first middle linking layer 126 has two linking ends 126a and 126b. The linking end 126a is overlapped with one connecting end 130a of the connecting layer 130 and one linking end 122a of the first bottom linking layers 122, and the linking end 126b is overlapped with one edge 109a of the upper pixel electrode 109 and the other linking end 122b of the first bottom linking layer 122. The second middle linking layer 128 has two linking ends 128a and 128b. The linking end 128a is overlapped with one connecting end 130b of the connecting layer 130 and one linking end 124a of the second bottom linking layer 124, and the linking end 128b is overlapped with one edge 110a of the lower pixel electrode 110 and the other linking end 124b of the second bottom linking layers 124.

Now referring to FIGS. 1 to 3, if a defect occurs at one of the first and second predetermined channels in the dual thin film transistor 108, one of the upper and lower pixel electrodes 109 and 110 may be defective and displayed as a bright dot or dark dot, so that the pixel cell formed by the upper and lower pixel electrodes 109 and 110 becomes defective. The method for repairing such a defective pixel cell will be described below.

In this embodiment, it is assumed that the upper pixel electrode 109 is found defective and displayed as a bright dot or dark dot. In order to repair the defective pixel electrode 109, firstly, the electrical path between the defective pixel electrode 109 and the first drain electrode 108b should be cut such that the defective pixel electrode 109 can be electrically isolated from the first drain electrode 108b. The electrical path can be cut by using a laser to cut off the connecting part 113 of the first drain electrode 108b as shown in FIGS. 1 and 2, such that the defective pixel electrode 109 is electrically isolated from the first drain electrode 108b, that is, electrically isolated from the dual thin film transistor 108.

Figure 4:
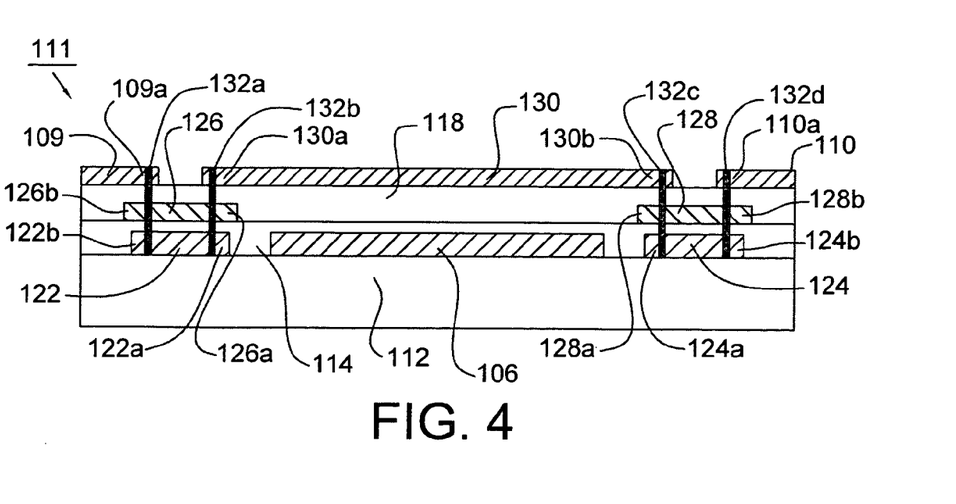
FIG. 4 shows a cross-sectional view of the pixel repairing structure shown in FIG. 3 after four welding points are formed with a laser.

Now referring to FIGS. 2 and 3, after the above cutting step, an electrical path between the defective pixel electrode 109 and the lower pixel electrode 110 then should be created such that the defective pixel electrode 109 and the lower pixel electrode 110 can be electrically connected together and driven by the second drain electrode 108c of the dual thin film transistor 108. The electrical path can be created by using the laser to form four welding points 132a, 132b, 132c and 132d in the pixel repairing structure 111 as shown in FIG. 4. The first welding point 132a is formed by welding the edge 109a of the upper pixel electrode 109, the linking end 126b of the first middle linking layer 126, and the linking end 122b of the first bottom linking layer 122. The second welding point 132b is formed by welding the connecting end 130a of the connecting layer 130, the linking end 126a of the first middle linking layer 126, and the linking end 122a of the first bottom linking layer 122. The third welding point 132c is formed by welding the connecting end 130b of the connecting layer 130, the linking end 128a of the second middle linking layer 128, and the linking end 124a of the second bottom linking layer 124. The fourth welding point 132d is formed by welding the edge 110a of the lower pixel electrode 110, the linking end 128b of the second middle linking layer 128, and the linking end 124b of the second bottom linking layer 124. When the four welding points 132a, 132b, 132c and 132d are formed by the laser, the defective pixel electrode 109 can be electrically connected to the lower pixel electrode 110 through the connecting layer 130 and the linking layers 122, 124, 126 and 128. Accordingly, the defective pixel electrode 109, together with the lower pixel electrode 110, can be driven by the second drain electrode 108c of the dual thin film transistor 108 so that the defective pixel cell is repaired.

After the defective pixel electrode 109 is repaired as shown in FIG. 4, the defective pixel electrode 109 and the lower pixel electrode 110 are electrically connected together and applied with the same data signal received from the common source electrode 108a, so that the pixel electrodes 109 and 110 can normally generate the same potential difference for rotating the liquid crystal within the pixel cell. Accordingly, the repaired pixel cell can realize a normal color as it used to do. In addition, if the dual thin film transistor 108 has a weaker driving ability and is not able to drive the pixel electrodes 109 and 110 to an exact voltage level through the second drain electrode 108c, the defective pixel cell still can not be easily perceived by an observer. Due to these advantages, the arrangement of the pixel cell and the method for repairing the defective pixel cell of the present invention are preferably applied to a liquid crystal display device having a liquid crystal panel larger than 17 inches.

FIGS. 5A-5E are plan views for illustrating a method for making the liquid crystal display device 100 shown in FIG. 1. FIGS. 6A-6E and 7A-7D are cross-sectional views for illustrating the method for making the dual thin film transistor 108 shown in FIG. 2 and the pixel repairing structure 111 shown in FIG. 3. In order to simply illustrate the method, only one pixel cell, one gate line and one data line are illustrated in FIGS. 5A-5E.

Figure 5A:
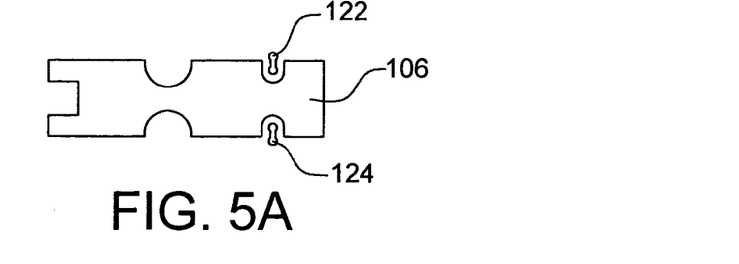
FIGS. 5A-5E are plan views for illustrating a method for making the liquid crystal display device shown in FIG. 1.
Figures 6A, 6B:
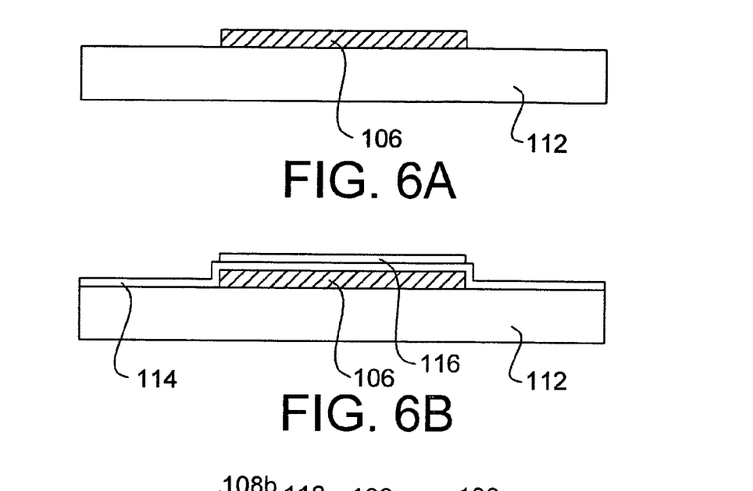
FIGS. 6A-6E are cross-sectional views for illustrating the method for making the dual thin film transistors shown in FIG. 2.
Figure 7A:
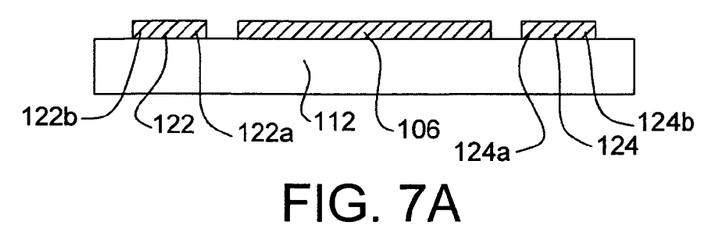

Referring to FIGS. 5A, 6A and 7A, a gate line 106, a first bottom linking layer 122 and a second bottom linking layer 124 are formed on a substrate 112. The gate line 106, the first bottom linking layer 122 and the second bottom linking layer 124 are formed by depositing at least one metal layer, e.g. aluminum (Al), copper (Cu), chromium (Cr), silver (Ag), gold (Au), molybdenum (Mo) or any other metal layer or any stacked metal layer, through a sputtering technique or other techniques, and then patterning it with a first mask.

Figure 5B:
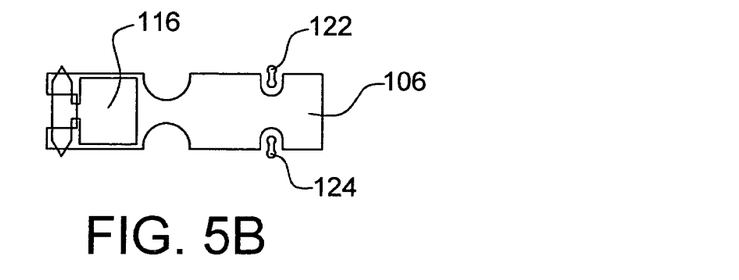
Figure 7B:
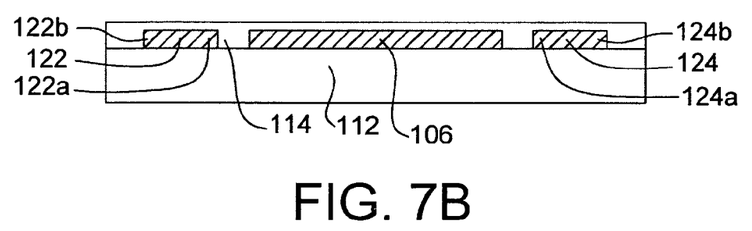

Referring to FIGS. 5B, 6B and 7B, a gate insulating layer 114 (not shown in FIG. 5B) is formed on the substrate 112 to cover the gate line 106, the first bottom linking layer 122 and the second bottom linking layer 124. The gate insulating layer 114 can be formed of an insulating material, e.g. silicon nitride (SiNx), silicon oxide (SiOx), or any other such material or any other transparent material. Thereafter, a semiconductor layer 116 is formed on the gate insulating layer 114 and overlapped with the gate line 106. The semiconductor layer 116 is formed by depositing a semiconductor material, e.g. an amorphous silicon on the gate insulating layer 114, and then patterning it with a second mask.

Figure 5C:
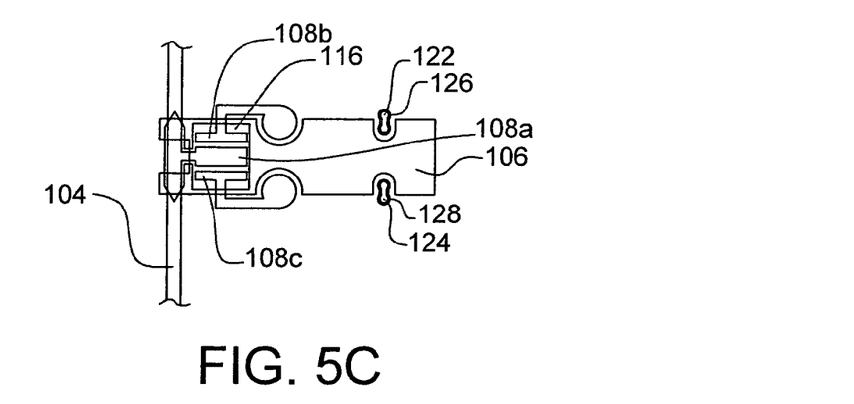
Figure 6C:
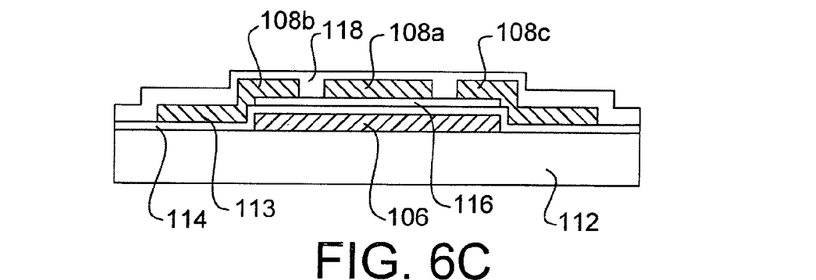
Figure 7C:
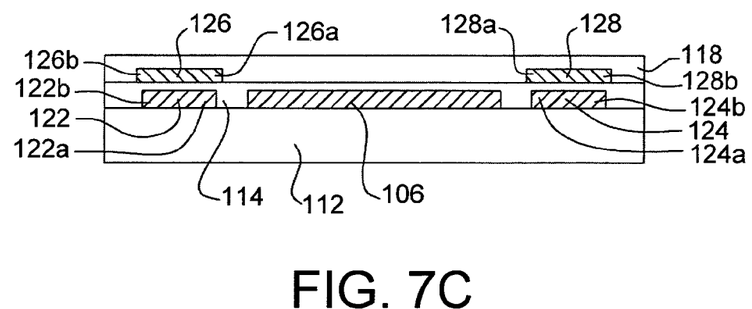

Referring to FIGS. 5C, 6C and 7C, a data line 104, a common source electrode 108a connected to the data line 104, a first drain electrode 108b, a second drain electrode 108c, a first middle linking layer 126 and a second middle linking layer 128 are formed. on the gate insulating layer 114. Further, the common source electrode 108a is formed on the semiconductor layer 116, and the first drain electrode 108b and the second drain electrode 108c are formed on the gate insulating layer 114 with parts of them covering the semiconductor layer 116. The data line 104, the common source electrode 108a, the first drain electrode 108b, the second drain electrode 108c, the first middle linking layer 126 and the second middle linking layer 128 are formed by entirely depositing at least one metal layer, e.g. magnesium (Mg), calcium (Ca), aluminum (Al), Barium (Ba), lithium (Li), silver (Ag), gold (Au) or any other metal layer or any stacked metal layer, through a CVD technique or a sputtering technique, and then patterning it with a third mask. Thereafter, a protective layer 118 (not shown in FIG. 5C) is formed on the gate insulating layer 114 to cover the data line 104, the common source electrode 108a, the first drain electrode 108b, the second drain electrode 108c, parts of the semiconductor layer 116, the first middle linking layer 126 and the second middle linking layer 128.

Figure 5D:
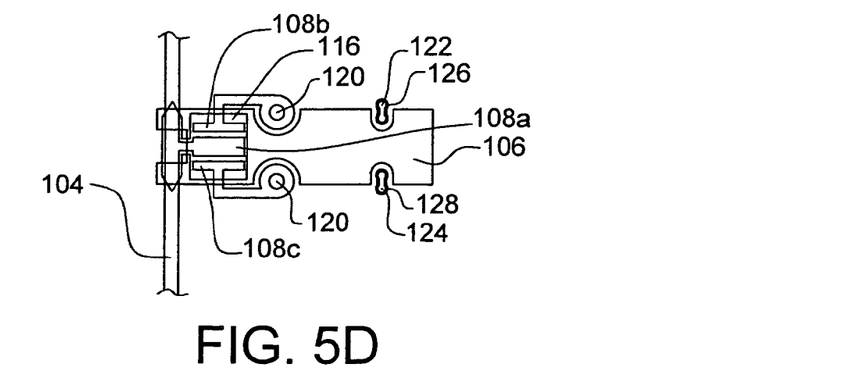
Figure 6D:
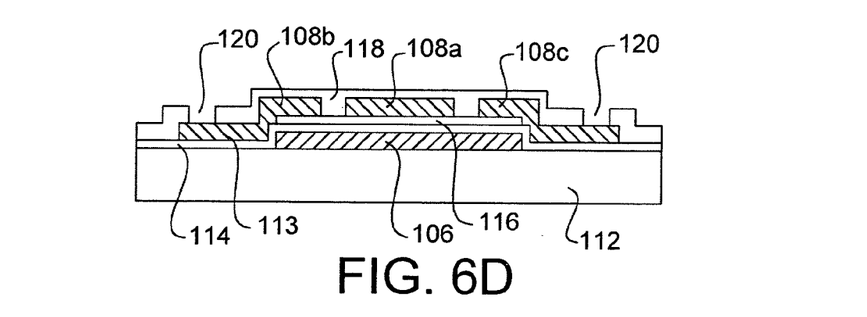

Referring to FIGS. 5D and 6D, the protective layer 118 is patterned with a fourth mask to form two contact holes 120 such that the first drain electrode 108b and the second drain electrode 108c are respectively exposed from the two contact holes 120.

Figure 5E:
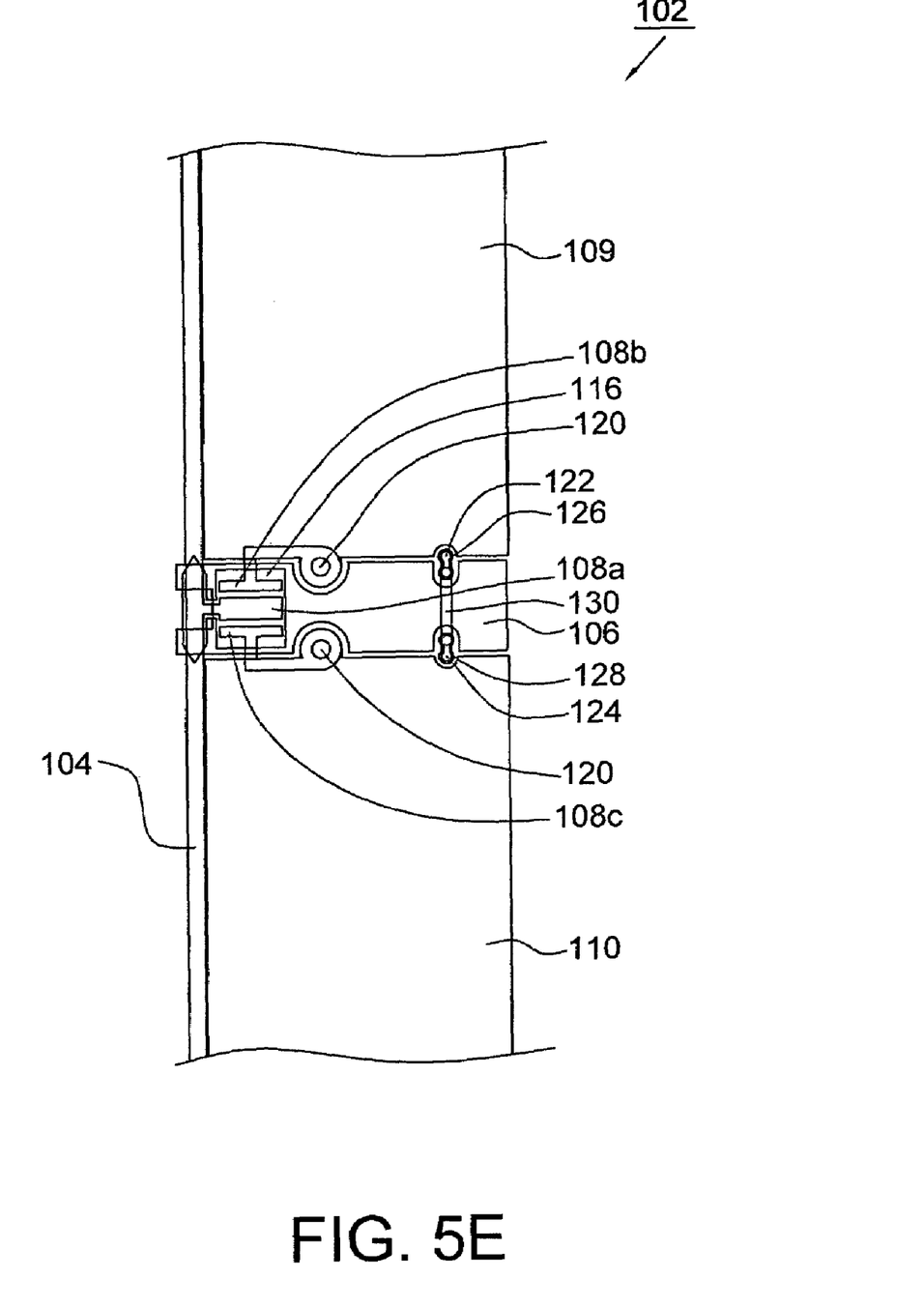
Figure 6E:
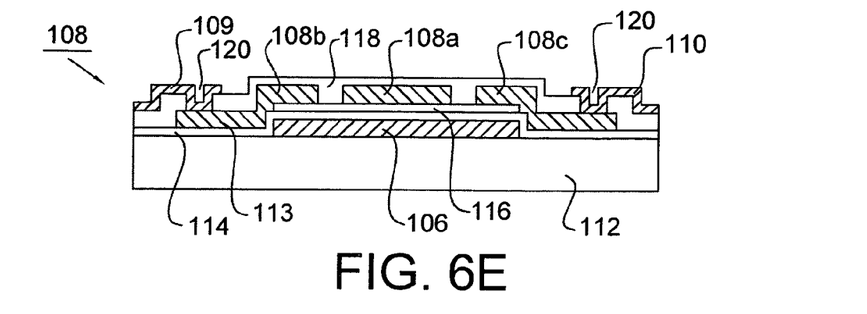
Figure 7D:
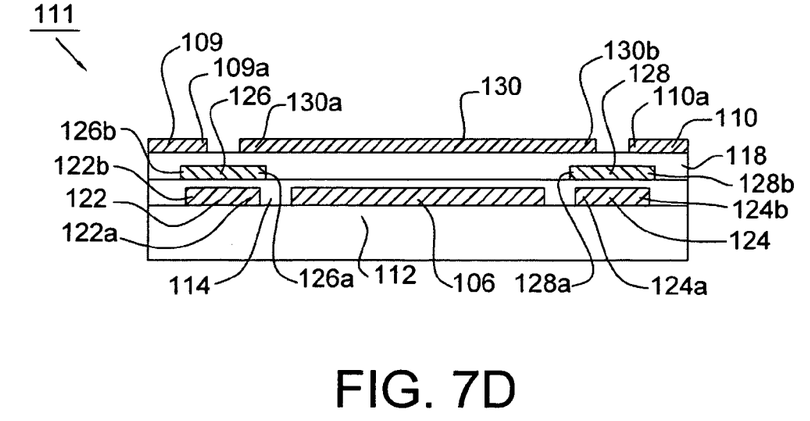

Referring to FIGS. 5E, 6E and 7D, an upper pixel electrode 109, a lower pixel electrode 110 and a connecting layer 130 are formed on the protective layer 118. In addition, the upper pixel electrode 109 and the lower pixel electrode 110 are further formed into the two contact holes 120 so as to be electrically connected to the first and second drains 108b and 108c, respectively. The upper pixel electrode 109, the lower pixel electrode 110 and the connecting layer 130 are formed by depositing at least one transparent conductive material, e.g. indium tin oxide (ITO), indium zinc oxide (IZO), indium oxide (IO), tin oxide (TO), zinc oxide (ZO), aluminum zinc oxide (AZO) or any other transparent conductive layer or any stacked conductive layer, on the protective layer 118, and then patterning it with a fifth mask.

According to the method for making the liquid crystal display device 100, the pixel repairing structure 111 is formed with the same masks and patterning processes as the dual thin film transistor 108 is done. For example, the first and second bottom linking layers 122 and 124, together with the gate line 106, are formed on the substrate 112 through the same mask, i.e. the first mask, and the same patterning process. The first and second middle linking layers 126 and 128, together with the data line 104, the common source electrode 108a, and the first and second drain electrodes 108b and 108c, are formed on the gate insulating layer 114 through the same mask, i.e. the third mask, and the same patterning process. In addition, the connecting layer 130, together with the upper and lower pixel electrodes 109 and 110, is formed on the protective layer 118 through the same mask, i.e. the fifth mask, and the same patterning process. Therefore, the pixel repairing structure 111 can be formed without utilizing any additional mask and patterning process.

In other embodiments according to the present invention, one pair of the first and second bottom linking layers 122, 124 and the first and second middle linking layers 126, 128 can be selectively formed for electrically connecting the connecting layer 130 and the upper and lower pixel electrodes 109 and 110 for repairing a pixel cell.

Figure 8:
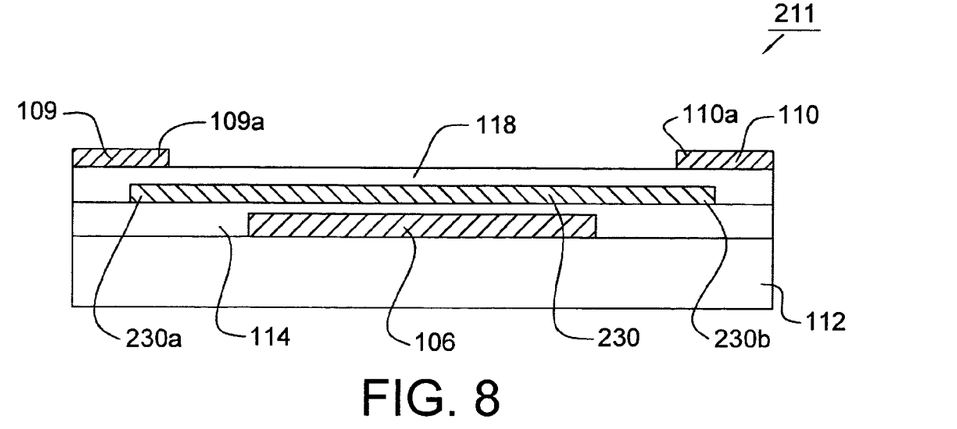
FIG. 8 shows a cross-sectional view of a pixel repairing structure according to another embodiment of the present invention.

FIG. 8 shows a cross-sectional view of a pixel repairing structure 211 according to another embodiment of the present invention. In this embodiment, the pixel repairing structure 211 is formed between the upper pixel electrode 109 and the lower pixel electrodes 110. Further, the pixel repairing structure 211 only includes a connecting layer 230 formed on the insulating layer 114 and covered with the protective layer 118. The connecting layer 230 has two connecting ends 230*a*, 230*b* overlapped with the edges 109*a*, 110*a* of the upper and lower pixel electrodes 109, 110 respectively.

Figure 9:
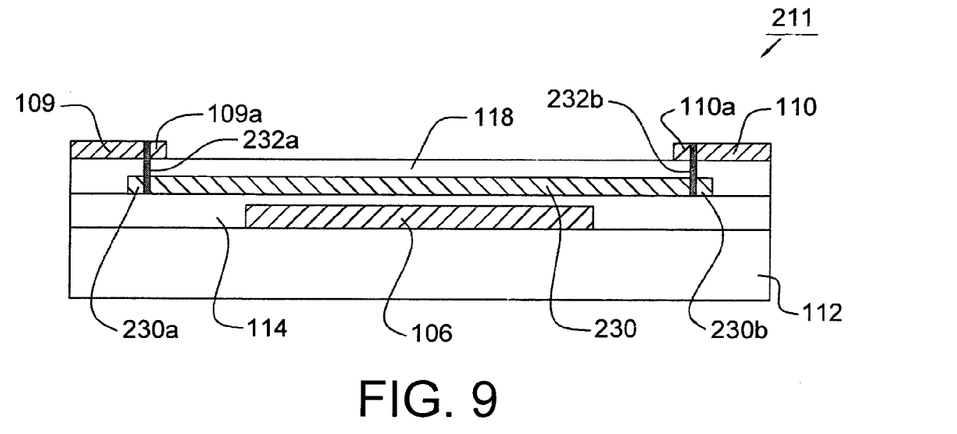
FIG. 9 shows a cross-sectional view of the pixel repairing structure shown in FIG. 8 after two welding points are formed with a laser.

Now referring to FIGS. 2 and 9, when a defect occurs at one of the first and second predetermined channels in the dual thin film transistor 108, one of the upper and lower pixel electrodes 109 and 110 may be defective and displayed as a bright dot or dark dot. In this embodiment, it is also assumed that the upper pixel electrode 109 is found defective and displayed as a bright dot or dark dot. In order to repair the defective pixel electrode 109, firstly, the connecting part 113 of the first drain electrode 108*b* in FIG. 2 is cut off by a laser such that the defective pixel electrode 109 can be electrically isolated from the first drain electrode 108*b* of the dual thin film transistor 108. Thereinafter, an electrical path between the defective pixel electrode 109 and the lower pixel electrode 110 is created by using the laser to form two welding points 232*a* and 232*b* in the pixel repairing structure 211 as shown in FIG. 9. The first welding point 232*a* is formed by welding the edge 109*a* of the upper pixel electrode 109 and the connecting end 230*a* of the connecting layer 230, and the second welding point 232*b* is formed by welding the edge 110*a* of the lower pixel electrode 110 and the connecting end 230*b* of the connecting layer 230. When the two welding points 232*a* and 232*b* are formed by the laser, the defective pixel electrode 109 can be electrically connected to the lower pixel electrode 110 through the connecting layer 230 such that the two pixel electrodes 109 and 110 are driven together by the second drain electrode 108*c* of the dual thin film transistor 108. In this manner, the defective pixel cell is repaired. Further, the connecting layer 230, together with the data line 104, the common source electrode 108*a*, and the first and second drain electrodes 108*b* and 108*c*, can be formed on the gate insulating layer 114 through the same mask and the same patterning process. Therefore, the pixel repairing structure 211 can be formed without utilizing any additional mask and patterning process.

Figure 10:
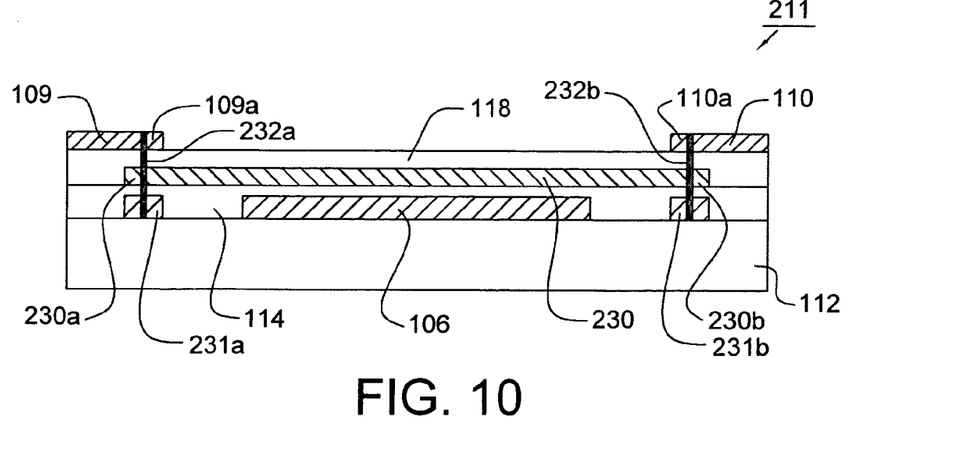
FIG. 10 shows a cross-sectional view of the pixel repairing structure according to another embodiment of the present invention.

In another embodiment as shown in FIG. 10, a first dummy layer 231 a and a second dummy layer 231*b* can be formed respectively adjacent to two sides of the gate line 106 and covered with the gate insulating layer 114. The first dummy layer 231*a* is overlapped with the end 230*a* of the connecting layer 230 and the defective pixel electrode 109 while the second dummy layer 231*b* is overlapped with the end 230*b* of the connecting layer 230 and the lower pixel electrode 110. Compared with the pixel repairing structure 211 as shown in FIG. 9, the first and second dummy layers 231*a* and 231*b* can increase the repairing efficiency while two welding points 232*a* and 232*b* are formed as shown in FIG. 10. Thus, an electrical path between the defective pixel electrode 109 and the lower pixel electrode 110 can be created by the two welding points 232*a* and 232*b* through the connecting layer 230, the first dummy layer 231*a* and the second dummy layer 231*b* as shown in FIG. 10. Also, the first and second dummy layers 231*a* and 231*b*, together with the gate line 106, can be formed on the substrate 112 through the same mask and the same patterning process.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A liquid crystal display device, comprising:
   a first sub-pixel electrode and a second sub-pixel electrode together forming a pixel cell;
   a dual thin film transistor having a first electrode electrically connected to the first sub-pixel electrode and a second electrode electrically connected to the second sub-pixel electrode;
   a gate line formed between the first and second sub-pixel electrodes for turning on/off the dual thin film transistor according to a scan signal; and
   a connecting layer formed across the gate line and between the first and second sub-pixel electrodes.

2. The liquid crystal display device as claimed in claim 1, further comprising:
   a gate insulating layer covering the gate line and having the first and second electrodes formed thereon; and
   a protective layer covering the first and second electrodes and having the first and second sub-pixel electrodes formed thereon.

3. The liquid crystal display device as claimed in claim 2, wherein the connecting layer is formed on the gate insulating layer and has two ends overlapped with the first and second sub-pixel electrodes respectively.

4. The liquid crystal display device as claimed in claim 3, further comprising:
   a first dummy layer being covered with the gate insulating layer and overlapped with one of the two ends of the connecting layer; and
   a second dummy layer being covered with the gate insulating layer and overlapped with the other one of the two ends of the connecting layer.

5. The liquid crystal display device as claimed in claim 2, wherein the connecting layer is formed on the protective layer.

6. The liquid crystal display device as claimed in claim 5, further comprising:
   a first linking layer being formed under the protective layer and having two linking ends overlapped with the first sub-pixel electrode and the connecting layer respectively; and
   a second linking layer being formed under the protective layer and having two linking ends overlapped with the second sub-pixel electrode and the connecting layer respectively.

7. The liquid crystal display device as claimed in claim 6, wherein the first linking layer and the second linking layer are formed on the gate insulating layer.

8. The liquid crystal display device as claimed in claim 7, further comprising:
   a third linking layer being covered with the gate insulating layer and having two linking ends overlapped with the two linking ends of the first linking layer respectively; and
   a fourth linking layer being covered with the gate insulating layer and having two linking ends overlapped with the two linking ends of the second linking layer respectively.

9. The liquid crystal display device as claimed in claim 6, wherein the first linking layer and the second linking layer are covered with the gate insulating layer.

10. The liquid crystal display device as claimed in claim 2, further comprising:
a semiconductor layer formed on the gate insulating layer, wherein a part of the first electrode and a part of the second electrode are formed on the semiconductor layer.

11. A method for repairing a pixel cell, applied to the liquid crystal display device of claim 3, the method comprising the steps of:
sensing a defective one of the first and second sub-pixel electrodes;
making the defective one of the first and second sub-pixel electrodes electrically isolated from the dual thin film transistor; and
connecting the first and second sub-pixel electrodes with the two overlapped ends of the connecting layer respectively.

12. The method as claimed in claim 11, wherein the making step is implemented by cutting off the electrical path between the defective one of the first and second sub-pixel electrodes and the dual thin film transistor.

13. The method as claimed in claim 11, wherein the connecting step is implemented by a laser.

14. The method as claimed in claim 11, wherein the connecting step further comprises:
connecting the first sub-pixel electrodes with a first dummy layer covered with the gate insulating layer and overlapped with one of the two ends of the connecting layer; and
connecting the second sub-pixel electrodes with a second dummy layer covered with the gate insulating layer and overlapped with the other one of the two ends of the connecting layer.

15. A method for repairing a pixel cell, applied to the liquid crystal display device of claim 6, the method comprising the steps of:
sensing a defective one of the first and second sub-pixel electrodes;
making the defective one of the first and second sub-pixel electrodes electrically isolated from the dual thin film transistor; and
connecting the first sub pixel electrode and the connecting layer with the two overlapped linking ends of the first linking layer respectively, and connecting the second sub-pixel electrode and the connecting layer with the two overlapped linking ends of the second linking layer respectively.

16. The method as claimed in claim 15, wherein the making step is implemented by cutting off the electrical path between the defective one of the first and second sub-pixel electrodes and the dual thin film transistor.

17. The method as claimed in claim 15, wherein the connecting steps are implemented by a laser.

18. The method as claimed in claim 15, wherein the first linking layer and the second linking layer are formed on the gate insulating layer, and the connecting step further comprises:
connecting the first sub-pixel electrode and the connecting layer with two overlapped linking ends of a third linking layer covered with the gate insulating layer respectively; and
connecting the second sub-pixel electrode and the connecting layer with two overlapped linking ends of a fourth linking layer covered with the gate insulating layer respectively.

* * * * *